(12) United States Patent
Miller

(10) Patent No.: US 12,330,002 B2
(45) Date of Patent: *Jun. 17, 2025

(54) FLUID AND TARGET COMPOUND TRANSMISSION PROTECTIVE DEVICE

(71) Applicant: Sentry Research LLC, Scottsdale, AZ (US)

(72) Inventor: James M. Miller, Scottsdale, AZ (US)

(73) Assignee: Sentry Research LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,648

(22) Filed: Apr. 22, 2024

(65) Prior Publication Data

US 2024/0269497 A1 Aug. 15, 2024

Related U.S. Application Data

(63) Continuation of application No. 17/534,103, filed on Nov. 23, 2021, now Pat. No. 11,964,176.

(60) Provisional application No. 63/117,912, filed on Nov. 24, 2020.

(51) Int. Cl.
| | |
|---|---|
| *A62C 35/68* | (2006.01) |
| *A62C 35/60* | (2006.01) |
| *A62C 37/36* | (2006.01) |
| *A62C 37/44* | (2006.01) |
| *F16L 55/10* | (2006.01) |

(52) U.S. Cl.
CPC ............ *A62C 35/68* (2013.01); *A62C 37/04* (2013.01); *A62C 37/44* (2013.01); *F16L 55/10* (2013.01); *A62C 35/60* (2013.01)

(58) Field of Classification Search
CPC ... F16L 55/10; F16L 55/1018; F16L 55/1022; F16L 55/1026; F16L 55/105; A62C 35/00; A62C 35/58; A62C 35/60; A62C 35/68; A62C 37/04; A62C 37/44; A62C 37/50; A62C 99/009
See application file for complete search history.

(56) References Cited

U.S. PATENT DOCUMENTS

| | | | | |
|---|---|---|---|---|
| 5,588,462 | A * | 12/1996 | McHugh | ............... G01F 1/28 137/557 |
| 6,131,604 | A * | 10/2000 | Harriss | ............... F16L 55/1018 137/382.5 |
| 6,396,404 | B1 * | 5/2002 | McHugh | ............... A62C 35/68 137/557 |

(Continued)

*Primary Examiner* — Darren W Gorman
(74) *Attorney, Agent, or Firm* — Thomas W. Galvani, P.C.; Thomas W. Galvani

(57) ABSTRACT

A protective device prevents tampering with a pipe system. The system transmits fluid from an upstream end to a downstream end of the system. The protective device includes a pipe insert disposed within the system between the upstream and downstream ends, and a valve within the pipe insert. The valve is moveable between open and closed positions, wherein the open position opens the pipe insert, enabling transmission of the fluid through the pipe insert, and the closed position occludes the pipe insert, disabling transmission of the fluid through the pipe insert to the downstream end of the system. The device includes a sensor for disposition within the fluid to detect a target compound in the pipe insert. The valve moves from the open position to the closed position when the sensor detects the target compound.

20 Claims, 4 Drawing Sheets

(56) References Cited

U.S. PATENT DOCUMENTS

| | | | |
|---|---|---|---|
| 10,410,501 B2* | 9/2019 | Klicpera | F16K 31/02 |
| 2014/0374125 A1* | 12/2014 | Johnson | A62C 35/60 |
| | | | 137/557 |
| 2016/0101307 A1* | 4/2016 | Montague | E03B 9/14 |
| | | | 137/287 |

* cited by examiner

FLUID AND TARGET COMPOUND TRANSMISSION PROTECTIVE DEVICE

CROSS-REFERENCE TO RELATED APPLICATIONS

This application is a continuation of and claims the benefit of U.S. patent application Ser. No. 17/534,103, filed Nov. 23, 2021, which claims the benefit of U.S. Provisional Application No. 63/117,912, filed Nov. 24, 2020, all of which are hereby incorporated by reference.

FIELD

The present specification relates generally to security, and more particularly to residential and commercial building hardening and security.

BACKGROUND

Building owners incorporate security measures to harden and protect all types of buildings in this post 9/11 world. From simple door locks and metal detectors to sophisticated visual target detection and analytic systems, all varieties of hardening solutions are available to protect entry of dangerous personnel. However, while some solutions keep out automated devices such as drones, most solutions are directed to preventing human ingress. Few solutions cover non-human threats.

Indeed, non-human safety threats, such as fire, are often handled through other means, such as fire code regulations. For example, most building have well-developed fire-suppression mechanisms. Modern building codes require the installation of fire control safety systems to prevent the spread of fire in a structure. Most commercial buildings are installed with sprinklers in the ceilings. These sprinklers typically have glass-tube heads filled with a glycerin-based liquid that act as physical barriers or plugs holding back water or a fire-retarding compound. As the temperature of the air in the room rises, so does the temperature of the liquid in the head, and, consequently, the volume of that liquid increases as well. At a certain temperature, the volume of the liquid exceeds that of the head containing the liquid, and the head breaks.

Before it breaks, the head acts as a plug at the end of the fire control safety system, with water filling the pipes behind the head. Then, when the head does break, the water supply in the piping assembly sprays out of the broken head and into the room. The water mitigates or potentially eliminates the fire in the room. This is the intended operation of a commercial fire sprinkler system.

Most commercial buildings have one or several dedicated rooms called fire control or riser rooms. FIG. 1 illustrates very generally one of those conventional riser rooms 10 and fire suppression system within a building 11. The riser room 10 centralizes the controls for the fire suppression system for the entire building 11. The riser room 10 typically includes sprinkler risers or system risers 12, which are the pipes that run throughout the building 11 and connect to individual sprinkler heads 13 in each room. The system risers are connected to a water supply pipe 14. Generally, this water supply pipe 14 is connected to a local or domestic water supply 15, such as a water main provided by the city or local body. The room 10 may also contain control equipment such as manual and automatic valves, pressure and flow rate sensors or gauges, pumps, and backflow prevention devices, as well as other equipment that fire and maintenance crews access.

The domestic water supply 15 is usually sufficient to provide a steady flow of water through the system risers 12 and the pipes to the sprinklers 13. However, on occasion, the supply may falter, or a valve may be inadvertently closed shutting off water completely, or un-permitted remodeling of the building may have changed the fire control needs of the building. For these reasons, building codes require a supplemental water supply source. This is the Fire Department Connection, or "FDC" 20.

The FDC 20 is always outside of the riser room 10. Sometimes, the FDC 20 projects laterally out of an exterior wall of the riser room 10. Other times, the FDC 20 may be a freestanding pipe near a sidewalk or curb by the riser room (as in FIG. 1). In either case, the FDC 20 generally consists of at least two inlet 21 couplings in a Y-arrangement (commonly known as a "Siamese connection"), coupled to a single standpipe 22. In some cases, there may be four inlet couplings. Regardless of the arrangement, the inlets 21 of the FDC 20 are coupled to the standpipe 22, which in turn is coupled to a dedicated pipe 23 that extends underground and into the riser room and then couples to the system riser 12, as shown in FIG. 1.

The fire department uses the FDC 20 during an emergency to supplement the domestic water supply 15. A fire crew arriving at the scene will connect a pump truck to the FDC inlets 21 and pump water into the FDC 20. This can increase the volume and speed of water through the fire control system, hopefully spreading more water in the building 11 to extinguish the fire faster.

Unfortunately, notwithstanding sensors and alarms for valve positions, there are few tamper safeguards in a fire sprinkler system. Both the domestic water supply line and the FDC water supply line have check valves 24, but these only prevent backflow of water into the municipal water supply. Otherwise, the system is essentially unprotected, and a nefarious actor could exploit the system with devastating consequences.

Both the domestic water supply line 15 and the FDC 20 present a security vulnerability in commercial buildings equipped with fire sprinkler systems. While the domestic water supply line 15 is usually buried, it could be accessed by someone with sufficient motivation. Similarly, if someone gains access to the fire control room 10, they could tamper with the water supply pipe 14 or the risers 12 directly. The FDC 20 is much more exposed: it is usually only capped with a disc-shaped metal cover secured with two threaded bolts. These covers are rarely, if ever, locked, and if so, the locks can be easily defeated, which means anyone can access the FDC 20. This presents a serious, widespread, and imminent concern for someone placing something dangerous or deadly into the FDC 20 and spreading it throughout the entire building. There is a serious and urgent need for hardening the security of the FDC 20 and fire control systems for buildings generally.

SUMMARY

An embodiment of a protective device prevents tampering with a pipe system. The system transmits fluid from an upstream end to a downstream end of the system. The protective device includes a pipe insert disposed within the system between the upstream and downstream ends, and a valve within the pipe insert. The valve is moveable between open and closed positions, wherein the open position opens the pipe insert, enabling transmission of the fluid through the pipe insert, and the closed position occludes the pipe insert, disabling transmission of the fluid through the pipe insert to the downstream end of the system. The device includes a sensor for disposition within the fluid to detect a target compound in the pipe insert. The valve moves from the open position to the closed position when the sensor detects the target compound.

An embodiment of a protective device includes a pipe in a pipe system for transmission of a flow of a fluid from an upstream end of the pipe system to a downstream end of the pipe system. The devices includes a pipe insert, disposed within the pipe system between the upstream and downstream ends. The pipe insert has a cylindrical body. A valve is within the pipe insert and is moveable between open and closed positions. The open position opens the pipe insert, enabling transmission of the flow of the fluid, and the closed position occludes the pipe insert, disabling transmission of the flow of the fluid. A sensor is within the pipe insert for disposition within the flow of the fluid to detect a target compound in the pipe insert. The valve moves from the open position to the closed position when the sensor detects the target compound.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Figure 1:
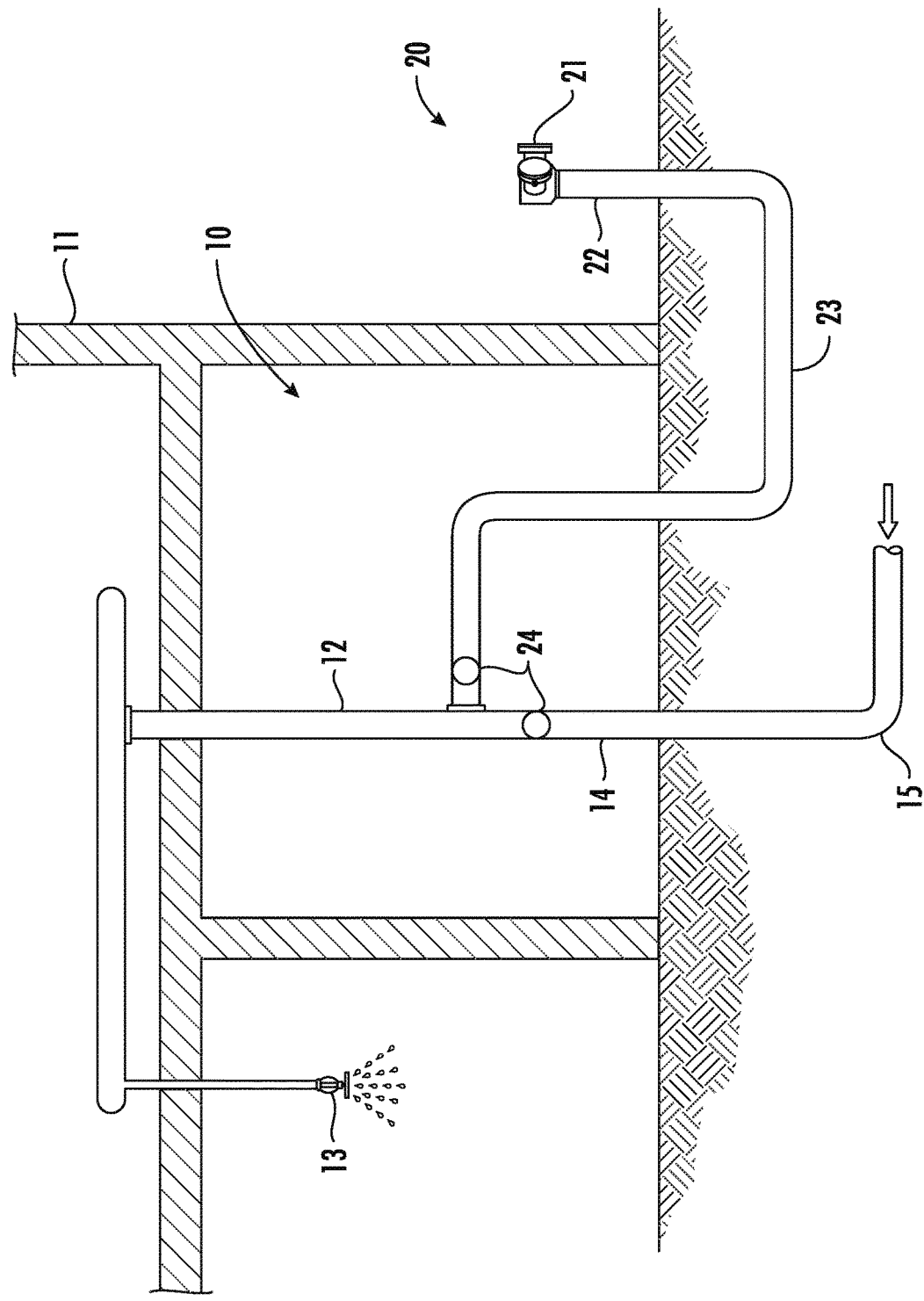
FIG. 1 is a generalized diagram of a building with a fire suppression system.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 2:
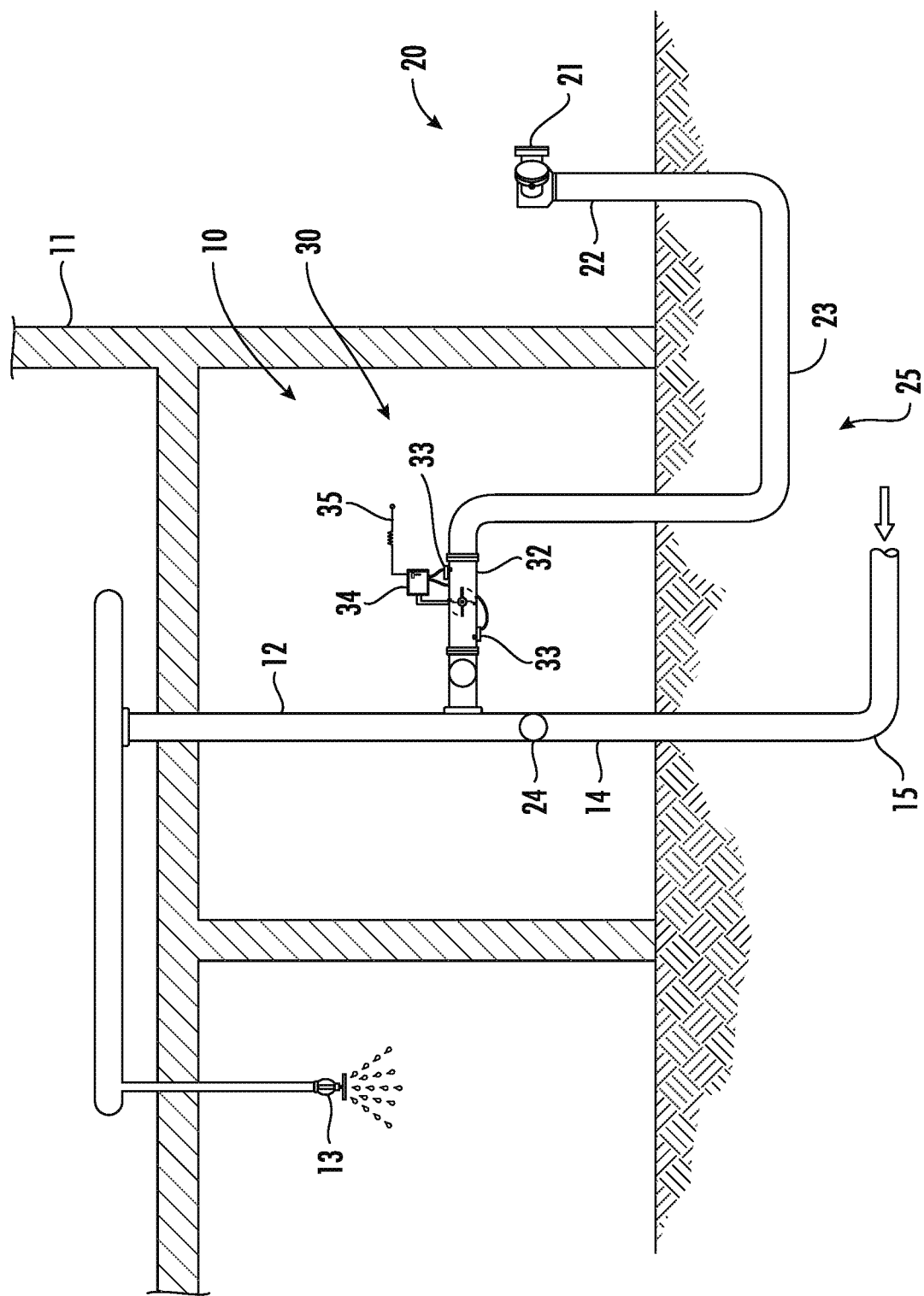
FIG. 2 is a generalized diagram of the building of FIG. 1 configured with a fluid and target compound transmission protective device.

FIG. 2 illustrates an improved, tamper-resistant fluid and target compound transmission protective device (hereinafter, the "device 30") for protecting the water supply and fire control pipe systems of a building. The device 30 is installed in-line on the pipe 23 to prevent the provision to and transmission of a dangerous compound from the FDC 20 to the building. However, in other embodiments, the device 30 is installed in-line on the water supply pipe 14 to the fire control system, and in yet other embodiments, the device 30 is installed in-line in the risers 12 after confluence of the pipe 23 and the water supply pipe 14. In still other embodiments, the device 30 is installed in-line on water supply lines for drinking and other water systems within a building, separate from fire control. The pipe 23, the FDC 20, the water supply pipe 14, and the risers 12 all are parts of a pipe system 25 for the building 11. The device 30 is applicable to any pipe or line in the pipe system 25 conventionally configured for the transmission of a fluid, whether that fluid is water, air, or other gasses or liquids (the term "fluid" is used herein to include water, air, gasses, liquids, target compounds, and anything else that flows or can flow through pipes of a pipe system 25). The embodiments shown in the drawings all depict the device 30 installed in the pipe 23, but the specification is not so limited, and the reader will understand that the device 30 may be installed and is operable in any pipe, such as the water supply pipe 14.

The device 30 includes a valve body or pipe insert 32, sensors 33, a computer 34, and an antenna 35. The device 30 immediately closes the pipe 23 when a potentially dangerous target compound is detected within the pipe insert 32 by either of the sensors 33. The device 30 also includes physical barriers and obstacles to prevent the insertion of an object such as a hose, into the pipe insert 32 which might defeat the pipe insert 32. For example, in some embodiments, the device 30 includes a mesh screen in the FDC 20, such as at the inlets 21. In other embodiments, the device 30 includes a mesh screen, baffles, or blockages further downstream, such as in the pipe 23 or in the pipe insert 32. In still other embodiments of the device 30, the pipe 23 includes an elbow, U-shaped, or other tight-radius bend to block a flexible hose from insertion into the device 30. Physical barriers such as these are discussed in more detail below.

Figure 3:
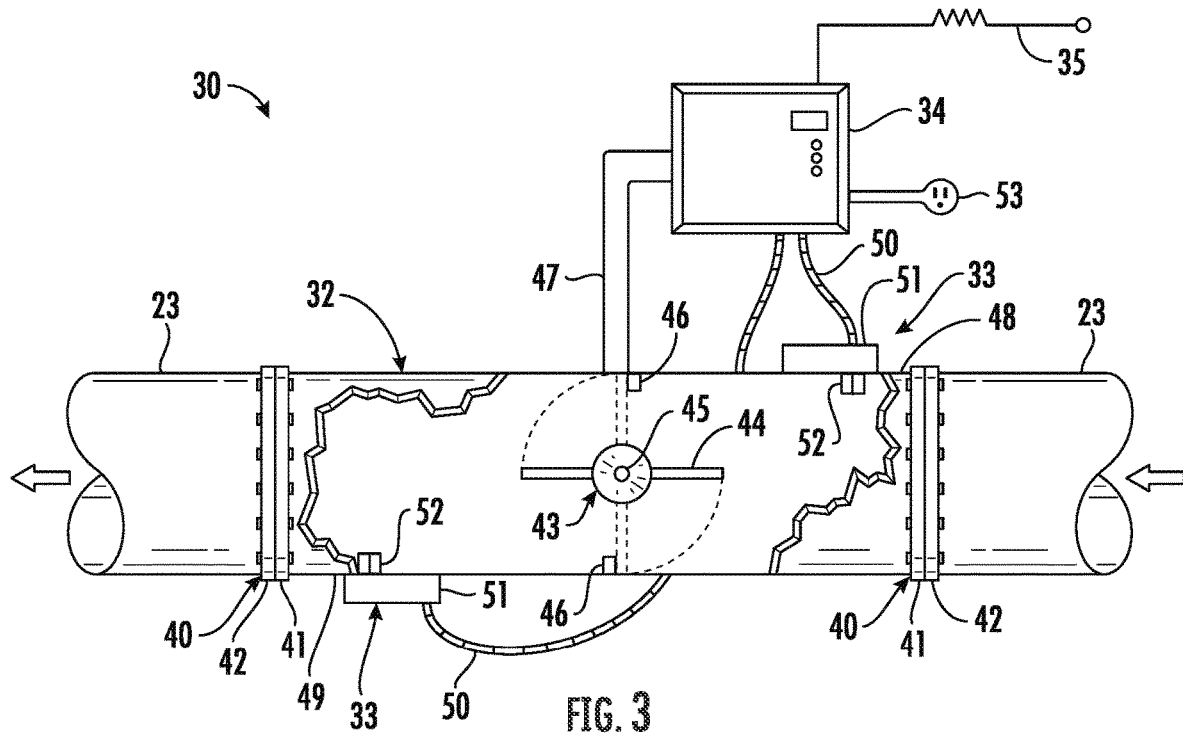
FIGS. 3, 4, and 5 are partially eroded views of three different embodiments of the protective device of FIG. 2.

Turning now to FIG. 3, which shows one embodiment of the device 30 in greater detail, the pipe insert 32 is a cylindrical-bodied pipe mounted in-line with the pipe 23. The pipe insert 32 contains a valve mechanism and is applied in-line with the pipe 23 at junctions 40. The pipe insert 32 carries flanges 41 at both upstream and downstream sides of the pipe insert 32, which flanges 41 register with and bolt to complemental flanges 42 in the pipe 23 to dispose, register, and secure the pipe insert 32 therein and form a fluid-impermeable seal with the pipe 23. Because the flanges 41 and 42 are bolted to each other at the junctions 40, the pipe insert 32 is removable and be replaced with a like pipe insert 32 or a different one. Incorporation of the device 30 into conventional a pipe system 25 does not require a complete replacement or reinstallation of the existing fire safety or plumbing system. Rather, if needed and if flanges 42 are not available, a section of the pipe 23 can be cut out and removed to expose an opening in the pipe 23 so that the pipe insert 32 may be installed in and welded to that opening.

Figure 4:
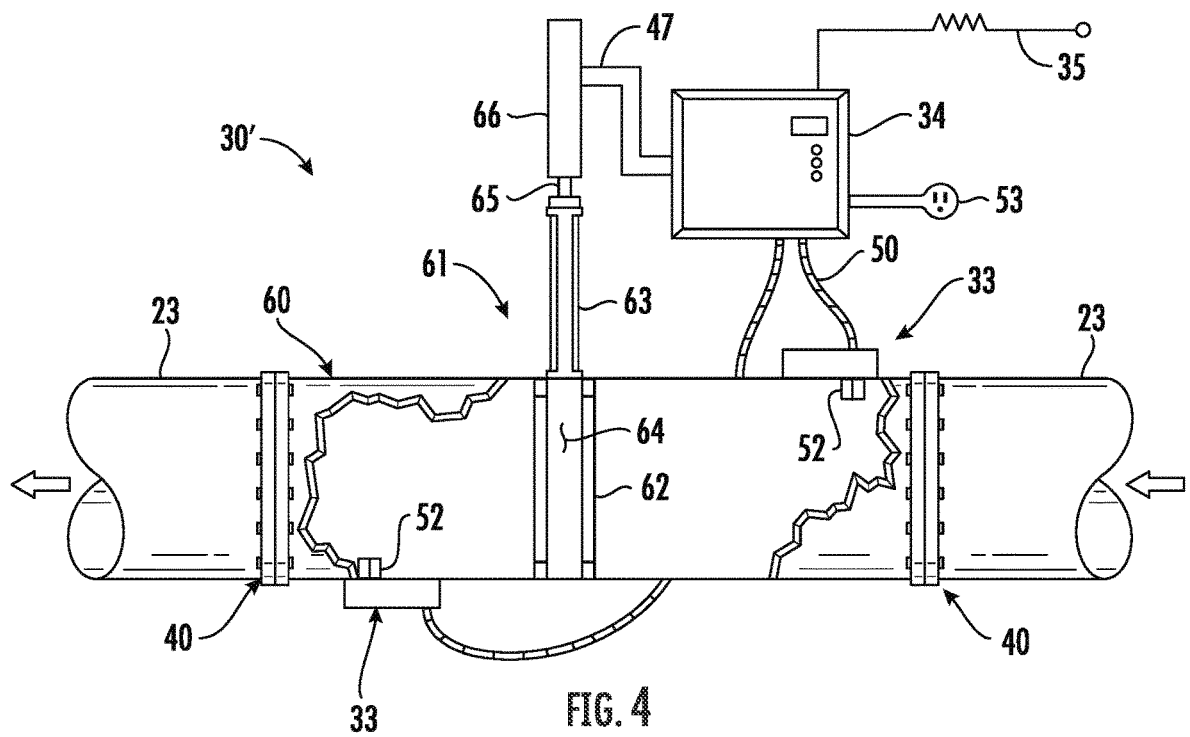
Figure 5:
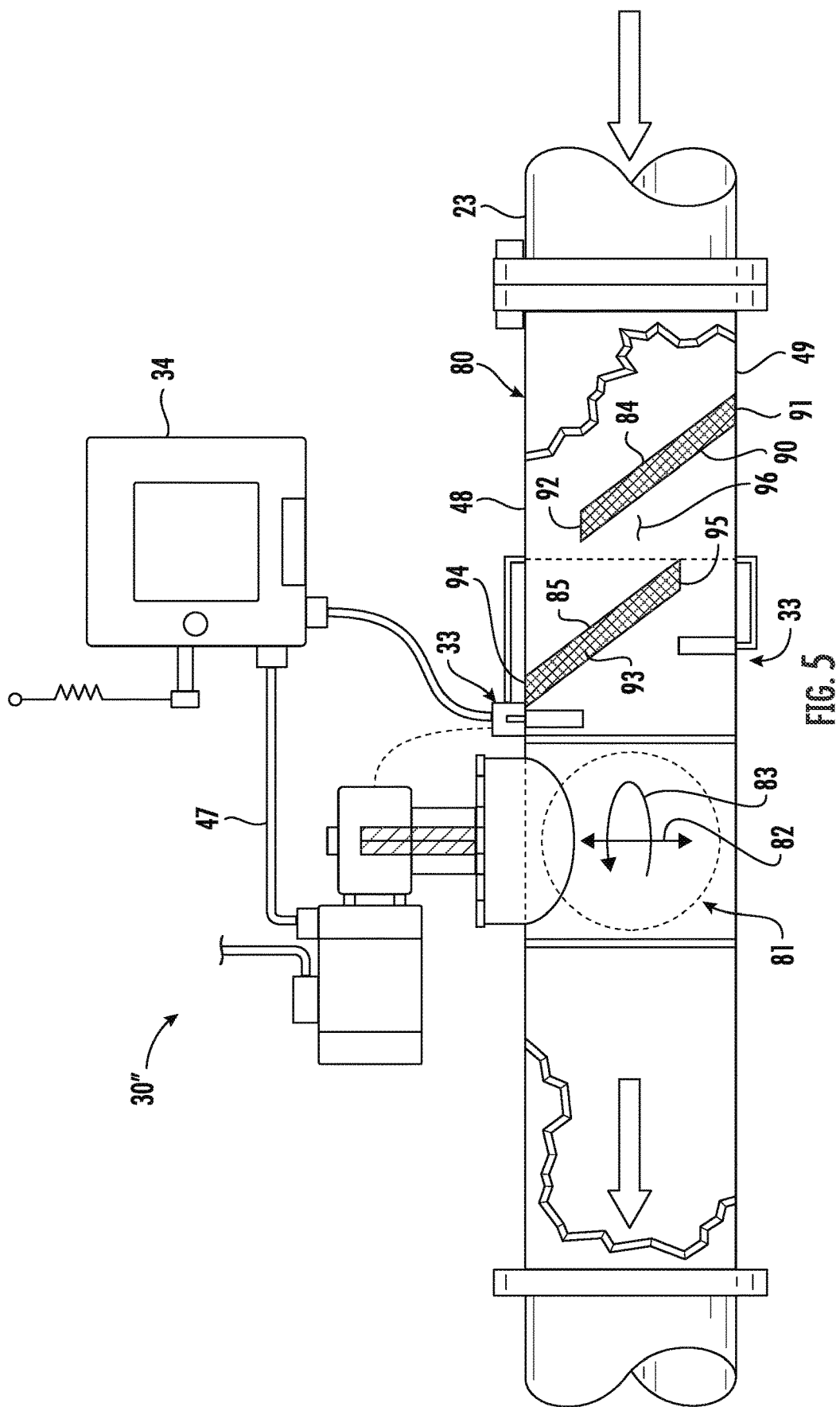

There are many embodiments of the device 30. FIG. 3 illustrates one embodiment of the device 30. FIG. 4 illustrates another embodiment using a different valve. FIG. 5 shows yet another embodiment of the device 30 in which the valve can be one of many different types of valves. In FIG. 3, the pipe 23 connected the FDC 20 to the system risers 12 is shown with the pipe insert 32 installed in line. The pipe insert 32 contains an internal valve known as a butterfly valve 43. The butterfly valve 43 contains a valve disc 44 mounted for rotation on a driven axle 45. The disc 44 is circular and corresponds to the size and shape of the interior of the pipe insert 32, which is preferably similar to the size and shape of the interior of the pipe 23. The axle 45 is mounted, in this drawing, such that it is normal to the page, and the valve disc 44 moves between first and second positions about the axle 45.

The first position of the valve disc 44 is an open position, shown in solid line in FIG. 3, and the second position of the valve disc 44 is a closed position, shown in broken line in FIG. 3. In the open first position, the valve disc 44 is aligned with a fluid flow through the pipe 23 and the pipe insert 32, and the pipe insert 32 is opened. In the closed position, the valve disc 44 is transverse to the fluid flow, seals against the inner dimension of the pipe insert 32, occludes the pipe insert 32, and thus blocks and disables transmission of the fluid through the pipe insert 32. In the embodiment shown in FIG. 3, when in the closed position, the valve disc 44 seats against a shoulder 46 formed on the inner surface of the pipe insert 32. The shoulder 46 is annular and extends at least partially around the inner surface of the pipe insert 32 and preferably at least at the top and bottom, or those locations which are ninety degrees offset from the location where the axle 45 couples to the pipe insert 32.

The axle 45 extends laterally entirely through the pipe insert 32 and is secured at opposite internal sides of the pipe insert 32. The axle 45 is driven by a motor. The motor is on the opposed side of the pipe insert 32 in the view of FIG. 3, but is a simple electrically-controlled motor or the like. The motor is itself coupled in electrical communication with the computer 34, preferably with a hard-wired multi-pin cable inside a protective housing 47. In other embodiments, the motor is coupled to the computer 34 with a WiFi or other wireless connection, such as Bluetooth, ZigBee, or the like, so long as such wireless connection is hardened and difficult to hack and defeat.

The computer 34 may be a desktop but may also be a pre-programmed PCB or logic controller like an Arduino board, or a minimal computer such as a Raspberry Pi. The computer 34 is coupled in electrical communication to sensors 33. As shown in FIG. 3, jacketed cables 50 extend between and couple the sensors 33 and computer 34 in communication. In other embodiments, the sensors 33 are coupled through a secured wireless connection. The sensors 33 are located both upstream and downstream of the butterfly valve 43. Preferably, the sensors 33 are also located on opposed sides of the pipe insert 32 such that they sample different locations of flow within the pipe insert 32. In the embodiment of FIG. 3, the sensor 33 which is upstream from the butterfly valve 43 is located proximate the top 48 of the pipe insert 32, and the sensor 33 which is downstream from the butterfly valve 43 is located proximate the bottom 49 of the pipe insert 32.

The sensors 33 shown in the embodiment of FIG. 3 are identical to each other in every way but location and orientation, and as such the disclosure herein describes only one sensor 33 with the understanding that the description applies equally to the other sensor 33. The sensor 33 includes a sensor housing or body 51 mounted onto the exterior of the pipe insert 32 and a probe or probes 52 extending through a small hole in the pipe insert 32 into the interior thereof. The sensor body 51 is sealed against the pipe insert 32 to prevent the ingress and egress of fluid or gas to the pipe 23 or pipe insert 32 through the hole under the sensor body 51. The probe 52 extends into the interior such that it is disposed in the flow of fluid when fluid is moving through the pipe 23 and the pipe insert 32. As such, the fluid in the pipe 23 moves over the probe 52 for detection by the sensor 33. Locating the sensors 33 at both the top 48 and bottom 49 of the pipe insert 32 helps ensure detection by the sensors 33.

Placing the sensor body 51 on the outside of the pipe insert 32 isolates it from any fluids or compounds in the pipe 23 which might damage the body 32. Moreover, with only the probe 52 placed within the pipe insert 32, the sensor 33 minimally disrupts flow within the pipe 23. Like the sensor body 51, the computer 34 is sealed in a housing to protect it from water ingress. That housing has a window and sealed buttons for a technician or fireman to interact with the computer 34. The housing additionally includes an input/output port so that a technician can connect a diagnostic tool to the computer 34 to locally read information from the computer and write data to the computer 34, as the case may be.

The computer 34 preferably has a hardened, secure, and dedicated power supply 53. The power supply 53 provides power to the computer 34 as well as to the antenna 35. In addition, the computer 34 is coupled to an uninterruptible power supply battery backup that provides power to both the computer 34 and the antenna 35 in the event that the dedicated power supply 53 stops delivering power. In most, if not all embodiments, power is also supplied to the motor driving the butterfly valve 43 and the sensors 33, and preferably that power has a redundant power backup power source, such as the uninterruptable power supply powering the computer 34.

The sensors 33 preferably include single dedicated probes 52 but may also have multiple probes 52 for detecting a variety of compounds, such as but not limited to organic compounds, volatile compounds, carcinogens, biological agents, bacteriological agents, viral agents, chemical agents, WMD compounds, and the like. The sensors 33 operate continuously, recording readings and transmitting those readings back to the computer 34. If either of the sensors 33 detects a dangerous or target compound in the pipe insert 32, it sends a signal to the computer 34. The computer 34 issues an instruction to the motor to rotate, thereby moving the butterfly valve 43 to a closed position and stopping further transmission of the compound through the pipe 23. At the same time, the computer 34 transmits a signal through the connected antenna 35 to a remote server or application. The server or application is monitored by a fire department or other governmental agency, which receives the signal as an alert. The signal contains information such as a date and timestamp, location of the computer 34, and the compound detected. The agency can then respond accordingly. In addition to the computer 34 transmitting alerts about potentially dangerous compounds and receiving instructions to open or close the pipe insert 32, the computer 34 also transmits regular reports to the remote server or application. Such reports include cycling data (including number, frequency, date, and duration of opening and/or closing of the pipe insert 32), maintenance and servicing data (for the computer 34, the antenna 35, the pipe insert 32, and/or the mechanisms for opening and closing the butterfly valve 43), test functions, remote systems checks, remote sensor checks, access reset data, component verifications, warnings, and the like.

In some embodiments, the butterfly valve 43 can be remotely opened. If the agency determines that it is safe to open the valve 43, it can transmit a signal back to the computer 34, which will then instruct the motor to operate and rotate the butterfly valve 43 into the open position. Alternately, a person on site can control the computer 34 with the buttons on the housing to instruct the computer 34 to open the butterfly valve 43. In other embodiments, the butterfly valve 43 has a handle extending out of the pipe insert 32, and the on-site person manually turns the valve 43 back into the open position. The butterfly valve 43 is biased into the open position, and in some embodiments, the butterfly valve 43 includes a torsional or other spring to bias it into that open position.

FIG. 4 illustrates an alternate embodiment of the device 30'; its reference character 30 is marked with a prime ("'") symbol to distinguish it from the device 30. Many of the structural features and elements of the device 30' are identical to the structural elements and features of the device 30, and as such, the same reference characters are used to identify those structural elements and features. In FIG. 4, the pipe 23 connecting the FDC 20 to the system risers 12 is fit with a different embodiment of a valve body or pipe insert 60 installed in line. The pipe insert 60 contains a sluice valve or gate assembly 61 which can be opened and closed. The gate assembly 61 includes an internal track 62 in the pipe insert 60 that slidably and snugly receives a guillotine-style plate 63. The track 62 is formed around and through the pipe insert 32, and the plate 63 is wider than the outer dimension of the pipe insert 60. The plate 63 is mounted for sliding, reciprocal movement within the track 62 between open and closed positions.

In the open position of the gate assembly 61, the plate 63 is disposed at an upper end of the track 62, just outside of the pipe insert 60, defining an opening 64 in the track 62 in communication with the pipe insert 60 on opposed sides of the track 62. The plate 63 is carried on an arm 65 of a pneumatic piston, a hydraulic piston, an electric solenoid 66, or the like (all of which are referred to generally here as the "solenoid 66"). The solenoid 66 is itself coupled in electrical communication with the computer 34. The solenoid 66 is coupled by cable in the housing 47 to the computer 34 and activates in response to an instruction signal from the computer 34; when the computer 34 issues a first signal to the solenoid 66, it actuates and extends the arm 65 to an advanced position, sliding the plate 63 through the track 62 to close the gate assembly 61. When the computer 34 issues a second signal to the solenoid 66, it actuates and retracts the arm 65 to a withdrawn position, sliding the plate 63 out of the track 62 to open the gate assembly 61.

FIG. 5 is another eroded view illustrating another embodiment of the device 30"; its reference character 30 is marked with a double-prime ("''") symbol to distinguish it from the devices 30 and 30'. There, the pipe 23 connecting the FDC 20 to the system risers 12 is fit with another embodiment of a valve body or pipe insert 80 installed in line. This pipe insert 80 contains a valve assembly 81 of any suitable type. The valve assembly 81 is represented merely as a broken circular line, indicating the general location of the valve assembly 81, and with two double-arrowed directional lines 82 and 83, indicating possible movement of the valve assembly 81 between open and closed positions.

This illustration of the valve assembly 81 shows that most valve types are suitable for use within the pipe insert 80. Indeed, other embodiments of closeable valves are considered to be within the scope of this disclosure though not specifically and explicitly identified herein. For example, other types of valve assemblies 81, such as a ball valve, are suitable for use within the valve body, so long as such valves may be mechanically mounted and electrically coupled to the computer 34 for automatic closure in response to detection of a target compound in the pipe insert 80 by at least one of the sensors 33. Alternatively, and without limitation, a diaphragm valve, a pinch valve, a piston valve, a plug valve, and a glove valve could be used. The valve assembly 81 shown in FIG. 5 is thus a placeholder or variable and could be any of the above exemplary valves or could be another suitable valve; the disclosure is not limited to any particular valve, so long as that valve will close in response to detection of a target compound by a sensor 33.

In the embodiment of the device 30", two sensors 33 are mounted upstream from the valve assembly 81 and no sensors are downstream. The sensors 33 are at the top and bottom of the device 30" and are just downstream from a set of guards 84 and 85.

The guards 84 and 85 are obstacles preventing insertion of an item through the pipe 23 and into the valve assembly 81 which might be used to block the valve assembly 81 from closing. The guards 84 and 85 act as physical barriers to prevent insertion of such an item or object. The guards 84 and 85 are identical but oriented in opposite directions. The guard 84 includes a rigid frame 90 having a base 91 and an opposed free end 92. The base 91 is secured to the inner surface of the bottom 49 of the pipe insert 80, and the guard 84 extends downstream into the interior of the pipe insert 80 and toward the opposite side of the pipe insert 80, terminating at the free end 92. The guard 84 extends beyond the center or middle 96 of the pipe insert 80.

The guard 85 also includes a rigid frame 93 having a base 94 and an opposed free end 95. The base 94 is secured to the inner surface of the top 48 of the pipe insert 80 opposite the base 91 of the other frame 90. The guard 85 then extends upstream into the interior of the pipe insert 80 and toward the opposite side of the pipe insert 80, terminating at the free end 95. The guard 85 extends beyond the middle 96 of the pipe insert 80. The free ends 92 and 95 of the guards 84 and 85 preferably flank the middle or center of the pipe insert 80, such that there preferably is no straight line extending from upstream or downstream in the pipe insert 80 which does not intersect at least one of the guards 84 and 85. In this way, the guards 84 and 85 block insertion of a rigid object. Moreover, because the guards 84 and 85 are oriented obliquely, toward each other, in opposite upstream and downstream directions, and overlap, the guards 84 and 85 also block insertion of a flexible pipe, conduit, wire, and the like. In other embodiments, similar guards are placed along the length of the pipe 23 to prevent insertion of an object further upstream from the valve assembly 81.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A protective device for preventing tampering with a fire control system in a building, the fire control system for transmission of a flow of a fluid from an upstream end of the fire control system to a downstream end of the fire control system at sprinklers within the building, the protective device comprising:
- a pipe insert disposed within the fire control system between the upstream and downstream ends;
- a valve within the pipe insert, the valve moveable between open and closed positions, wherein the open position opens the pipe insert, enabling transmission of the flow of the fluid through the pipe insert, and the closed position occludes the pipe insert, disabling transmission of the flow of the fluid through the pipe insert to the downstream end of the fire control system; and
- a sensor for disposition within the flow of the fluid to detect a target compound in the pipe insert;
- wherein the valve moves from the open position to the closed position when the sensor detects the target compound.

2. The protective device of claim 1, wherein the valve is biased into the open position.

3. The protective device of claim 1, wherein the sensor includes a first sensor upstream from the valve and a second sensor downstream from the valve, and the valve moves from the open position to the closed position when either of the first or second sensors detects the target compound.

4. The protective device of claim 1, further comprising a computer coupled to the sensor in data communication and coupled to a communications network.

5. The protective device of claim 1, further comprising guards disposed within the pipe insert, wherein the guards are rigid and define an obstacle to the transmission of the flow in a straight line between the upstream and downstream ends.

6. The protective device of claim 5, wherein the guards are upstream of the valve.

7. The protective device of claim 5, wherein the guards are disposed on opposite sides of the pipe insert, extend beyond a middle of the pipe insert, and have opposite orientations.

8. A protective device for preventing tampering with a pipe system in a building, the pipe system for transmission of a flow of a fluid from an upstream end of the pipe system to a downstream end of the pipe system, the protective device comprising:
- a pipe insert disposed within the pipe system between the upstream and downstream ends;
- a valve within the pipe insert, the valve moveable between open and closed positions, wherein the open position opens the pipe insert, enabling transmission of the flow of the fluid through the pipe insert, and the closed position occludes the pipe insert, disabling transmission of the flow of the fluid through the pipe insert; and
- a sensor within the pipe insert for disposition within the flow of the fluid to detect a target compound in the pipe insert;
- wherein the valve moves from the open position to the closed position when the sensor detects the target compound.

9. The protective device of claim 8, wherein the valve is biased into the open position.

10. The protective device of claim 8, wherein the sensor includes a first sensor upstream from the valve and a second sensor downstream from the valve, wherein the valve moves from the open position to the closed position in response to either of the first or second sensors detecting the target compound.

11. The protective device of claim 8, further comprising a computer coupled to the sensor in data communication and coupled to a communications network.

12. The protective device of claim 8, further comprising guards disposed within the pipe insert, wherein the guards are rigid and define an obstacle to the transmission of the flow in a straight line between the upstream and downstream ends.

13. The protective device of claim 12, wherein the guards are upstream of the valve.

14. The protective device of claim 12, wherein the guards are disposed on opposite sides of the pipe insert, extend beyond a middle of the pipe insert, and have opposite orientations.

15. A protective device for preventing tampering with a pipe system in a building, the pipe system for transmission of a flow of a fluid from an upstream end of the pipe system to a downstream end of the pipe system, the protective device comprising:
- a pipe insert disposed within the pipe system between the upstream and downstream ends;
- a valve within the pipe insert, the valve moveable between first and second positions, wherein the first position enables transmission of the flow of the fluid through the pipe insert, and the second position disables transmission of the flow of the fluid through the pipe insert; and
- a sensor for disposition within the flow of the fluid to detect a target compound in the pipe insert;
- wherein the valve moves from the first position to the second position when the sensor detects the target compound.

16. The protective device of claim 15, wherein the valve is biased into the first position.

17. The protective device of claim 15, wherein the sensor includes a first sensor upstream from the valve and a second sensor downstream from the valve, wherein the valve moves from the first position to the second position in response to either of the first or second sensors detecting the target compound.

18. The protective device of claim 15, further comprising guards disposed within the pipe insert, wherein the guards are rigid and define an obstacle to the transmission of the flow in a straight line between the upstream and downstream ends.

19. The protective device of claim 18, wherein the guards are upstream of the valve.

20. The protective device of claim 18, wherein the guards are disposed on opposite sides of the pipe insert, extend beyond a middle of the pipe insert, and have opposite orientations.

* * * * *